United States Patent [19]
Usherovich

[11] Patent Number: 5,724,883
[45] Date of Patent: Mar. 10, 1998

[54] HOT/COLD BEVERAGE BREWING DEVICE

[75] Inventor: Boris Usherovich, Staten Island, N.Y.

[73] Assignee: Franklin Industries, L.L.C., Brooklyn, N.Y.

[21] Appl. No.: 653,917

[22] Filed: May 28, 1996

[51] Int. Cl.[6] .............................. A47J 31/00; A47J 31/50
[52] U.S. Cl. ........................ 99/290; 99/304; 99/323.3; 426/433
[58] Field of Search ........................... 99/290, 295, 304, 99/323.3, 275, 279; 426/433; 222/146.1; 141/82

[56]  References Cited

U.S. PATENT DOCUMENTS

| | | | |
|---|---|---|---|
| 4,211,342 | 7/1980 | Jamgochian et al. | 222/146.1 X |
| 4,448,113 | 5/1984 | Brabon | 99/290 |
| 4,649,809 | 3/1987 | Kanezashi | 99/290 |
| 5,285,718 | 2/1994 | Webster et al. | 99/290 |

*Primary Examiner*—Reginald L. Alexander

[57]  ABSTRACT

A beverage brewing device is provided which includes a conventional brewing assembly, and a cooling assembly for brewing a hot beverage and then dispensing the beverage as a hot beverage or diverting it to the cooling system to dispense it as a cold beverage. A switching assembly is provided to permit the user to selectively choose between a hot beverage and cold beverage. The device also provides a novel cooling cartridge which permits the introduction of hot liquid and results in the dispensing of cold liquid from the cold cartridge.

24 Claims, 15 Drawing Sheets

HOT/COLD BEVERAGE BREWING DEVICE

BACKGROUND OF THE INVENTION

1. Field of the Invention

The present application relates to appliances for heating a quantity of water and brewing a beverage, and in particular relates to a device for brewing a beverage and dispensing the beverage either as a hot beverage or a cold beverage, as chosen by the user. The device provides a cooling system which operates without the use of refrigeration and which cools the beverage without diluting the beverage during the cooling process in a first embodiment, and which controls cooling by delivering a preset ratio of cold water to the hot brewed beverage in a second embodiment. The present application further relates to a cold retaining cartridge which is utilized with the beverage brewing device to chill the hot brewed beverage.

2. Discussion of the Prior Art

Beverage brewing devices such as those for making coffee, tea and other brewed beverages, are well known in the art. In a typical drip-type coffee maker, water is delivered from a reservoir to a heater, converted to steam and delivered to a vicinity adjacent a brew basket which contains filter paper and ground beverage media, such as ground coffee or tea leaves. The steam recondenses into water and drips over the ground coffee or tea leaves, through the filter basket and into a collection carafe or pitcher positioned below the filter basket.

Appliances for brewing and dispensing a cold beverage such as iced tea or iced coffee are also known in the art. These devices are generally characterized into two groups: devices which cool or chill the beverage through the use of a refrigeration unit, and those that chill the beverage through the use of ice cubes where the hot beverage runs over the ice cubes to simultaneously cool and dilute the beverage.

The refrigeration-type units, while effective, generally require a large space within the appliance and are typically utilized in commercial applications. To provide a refrigeration unit in a household appliance would be cost prohibitive and generally would require an appliance which is too large for use in locations typically utilized for household appliances, such as a countertop or tabletop. Furthermore, such a refrigeration unit would require large amounts of energy to operate, and would serve to drive the cost of the appliance upward to a point where it would not be an economical purchase for a typical consumer. Furthermore, beverage brewing appliances tend to be intermittently used, as well as being seasonal. Therefore, to continually run the refrigeration unit for a device which is used intermittently during the course of the day would not be energy and cost efficient.

The prior art contains a number of appliances for making an iced or cold beverage such as iced tea or iced coffee, which utilize ice cubes to cool the hot beverage after it is dispensed from the brewing device. However, these devices are typically no different than the conventional drip coffee maker, in that they brew the beverage and dispense it from the appliance as a hot beverage which is then cooled and diluted by the ice cubes which are placed in a pitcher or carafe beneath the dispensing spout of the appliance. The disadvantage of these types of appliances lies in the fact that a specific ratio of ice cubes to brewed beverage is required; otherwise, the resultant iced beverage is either too concentrated or overly dilute. The size of the ice cubes, and the number of cubes used, is left to the user in a trial and error manner, and thus making beverages which are consistent in strength and flavor from cycle to cycle is rarely possible.

Accordingly, there is a need for a brewing device which provides a user selectable hot brewed beverage or a chilled or iced beverage, without the costs and size required for a refrigeration unit to be built into the appliance. There is also a need for an iced or chilled beverage brewing appliance which dispenses a chilled brewed beverage without the use of ice cubes to chill and dilute the concentrated brewed beverage.

Furthermore, there is also a need for a self-contained chilling device which permits the introduction of a warm or hot beverage and which results in the dispensing of a chilled or cold beverage through the chilling device.

SUMMARY OF THE INVENTION

The beverage brewing device of the subject invention essentially comprises a brewing system and a cooling system, and incorporates a novel switching assembly which allows the user to choose between dispensing a hot brewed beverage or a cold brewed beverage. The switching assembly also provides for brewing a hot beverage and then switching to a cold beverage during the brewing process to simultaneously brew a hot beverage and a cold beverage. In a first embodiment, the novel cooling system provides for cooling the hot brewed beverages in a series of stages so that the beverage may be cooled without the use of a refrigeration unit and without diluting the brewed beverage through the use of ice cubes.

The brewing mechanism of the present device utilizes a conventional coffee maker brewing system in which water is placed in a reservoir and fed in metered amounts to a heating assembly which relatively instantaneously converts the water to steam and delivers the steam via a riser tube to an area above a filter basket where the steam recondenses to water. Located within the filter basket is ground beverage media, such as coffee grounds or tea leaves, which may be in self-contained packets or resting in a filter constructed of a paper-like material. As the steam condenses into water at the location above the grounds, the water fills the filter basket and steeps the beverage in the basket to create the hot brewed beverage. The hot brewed beverage then is gravity fed through an outlet in the filter basket to a pitcher or carafe located beneath the outlet.

Once the brewing process begins, the user has the option of directing the hot beverage directly into a first carafe positioned beneath the brew basket outlet, or diverting the stream of hot brewed beverage to the cooling system located within the housing of the brewing device. The stream of hot brewed beverage is diverted through the use of a novel switching mechanism, which diverts the flow of hot brewed beverage into the cooling system. The cooling system of the present invention routes the hot brewed beverage through a series of cooling stages, and ultimately passes the brewed beverage through a novel cold retaining cartridge which is positioned in the appliance. The cartridge includes at least one cooling element which is chilled or frozen in the freezer of a refrigerator prior to use. The cartridge includes an inlet and outlet which is connected by at least one passageway which allows the beverage to pass from the inlet through the passageway and over the cooling element to chill the beverage, until it ultimately leaves the cartridge via the outlet.

In a preferred embodiment, the cooling system includes three cooling stages: the first stage is an air cooling stage in which the liquid beverage is spread out in a thin layer on an air cooling pan to permit dissipative air cooling of the beverage. The beverage then passes to the second stage which utilizes a unique heat exchange cooling mechanism in which the warm beverage is further cooled through a heat exchange surface so that the heat dissipates into the cold fresh water which is in the reservoir of the appliance. From the second stage, the cooled beverage then passes to the cartridge where it is further chilled so that it exits the appliance into a secondary carafe or pitcher as a cold brewed beverage.

In another embodiment, the cooling system may comprise only the cold retaining cartridge, so that the hot beverage may pass directly through the cartridge for cooling. Preferably, the cartridge is positioned directly beneath the filter basket or sleeping container so that the hot brewed beverage is cooled directly by the cartridge as it is dispensed from the basket and ultimately into a carafe or pitcher. In this embodiment, the concentrated brewed beverage may be diluted utilizing water from the cold water reservoir, so that the amount of brewed beverage is substantially equal to the amount of fresh water that was initially placed into the device prior to brewing. Therefore, the dilution ratio of brewed beverage to fresh water is automatically controlled by the appliance so that each cycle yields a beverage whose concentration, and flavor, is consistent from cycle to cycle.

The unique cold retaining cartridge preferably consists of a plurality of liquid or gel filled cooling elements each having an aluminum or copper rod positioned therein, whereby the plurality of cooling elements are packaged in an outer enclosure which includes an inlet and an outlet to define a series of passageways to permit the liquid to enter the cartridge as a warm or hot liquid and exit the cartridge as a cool or cold liquid, depending on the initial temperature of the cartridge itself. The cartridge is designed to be placed in a refrigerator and chilled to approximately −10° C. prior to use.

BRIEF DESCRIPTION OF THE DRAWINGS

Further features of the invention will become more apparent from the accompanying drawings and the following detailed description of the subject hot/cold beverage brewing device. Preferred embodiments of the subject brewing device will be described hereinbelow with reference to the drawings, in which.

DETAILED DESCRIPTION OF THE PREFERRED EMBODIMENTS

Figure 1:
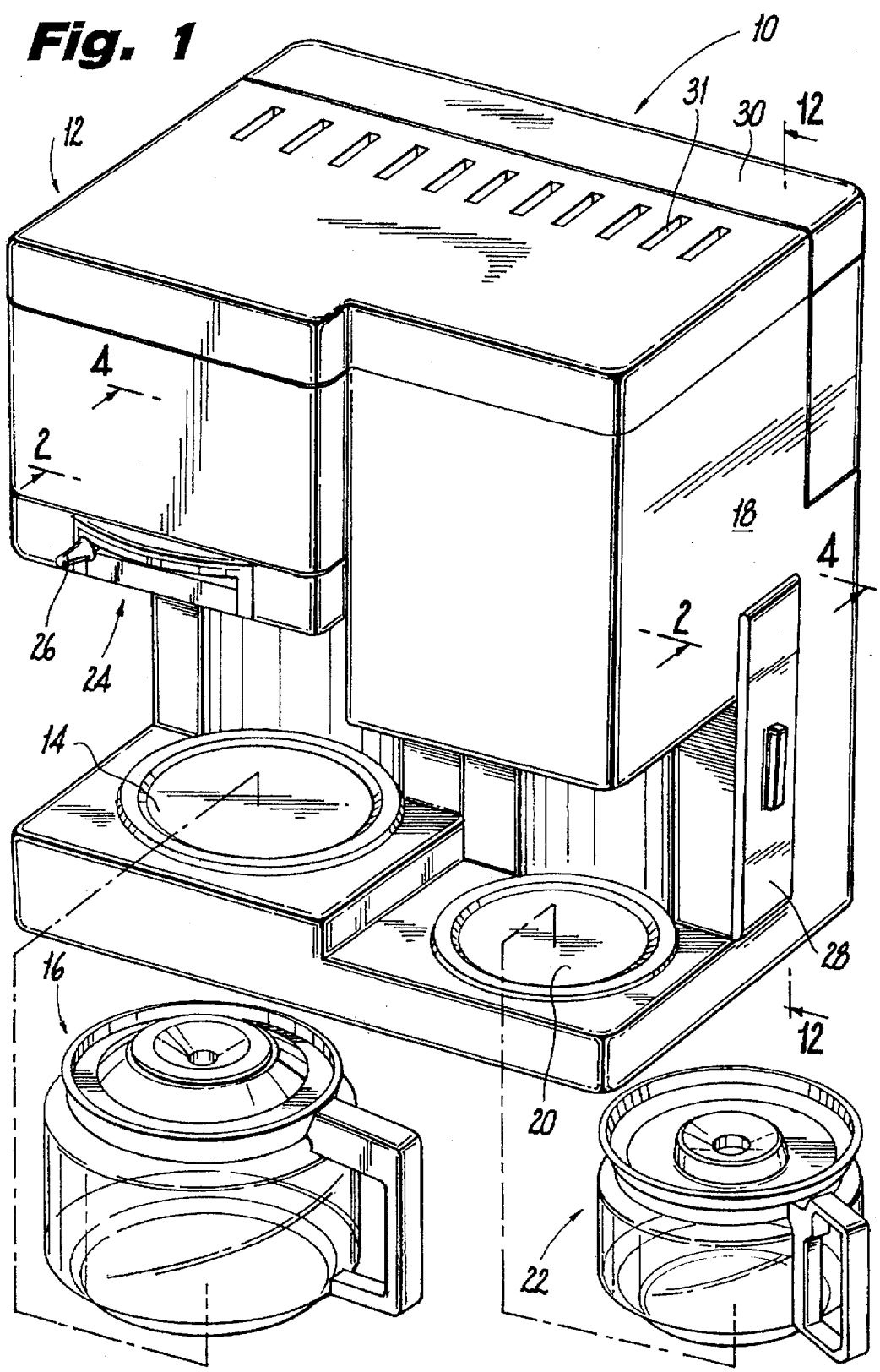
FIG. 1 is a perspective view of the hot/cold beverage brewing device.

Referring now in detail to the drawings, in which like reference numerals identify similar or identical elements, a first embodiment of the hot/cold beverage brewing device is illustrated in FIG. 1 and is designated generally by reference numeral 10. Brewing device 10 includes components which brew a hot beverage in a manner similar to that known in the art for drip coffee makers, and allows a user to brew a hot beverage, or a cold beverage such as iced coffee or iced tea. The brewing device 10 also provides for brewing a hot beverage and a cold beverage during the same operational cycle.

As seen in FIG. 1, brewing device 10 includes two carafes, 16 and 22, for collecting hot brewed beverage and cold brewed beverage, respectively. The side of the device 10 for brewing and collecting the hot beverage is generally designated as 12, while the side of the device 10 for cooling and collecting the cold beverage is generally designated as 18. The hot side 12 includes a warming plate 14, which also carries on its underside the heater assembly 34 for creating steam to brew the hot beverage. Warming plate 14 is shown in greater detail in FIG. 2. The cold side 18 of the brewing device 10 includes a carafe holder 20, which is dimensioned to receive the carafe 22 and to maintain it in place. In order to permit the user to choose between a hot brewed beverage and a cold brewed beverage, a switching assembly 24 is provided which includes a lever 26 for switching between hot and cold dispensed beverages. Switching assembly 24 is described in greater detail below.

The cold side 18 of the device 10 also includes a storage area for a cold retaining cartridge, which is placed within the device 10 at storage area 28. The cold cartridge and the entire cooling process will be described in greater detail below. The top of the device 10 includes a reservoir cover 30 which permits the introduction of fresh water to the appliance, and vent holes 31 are provided on the top to assist in the cooling process.

Figure 2:
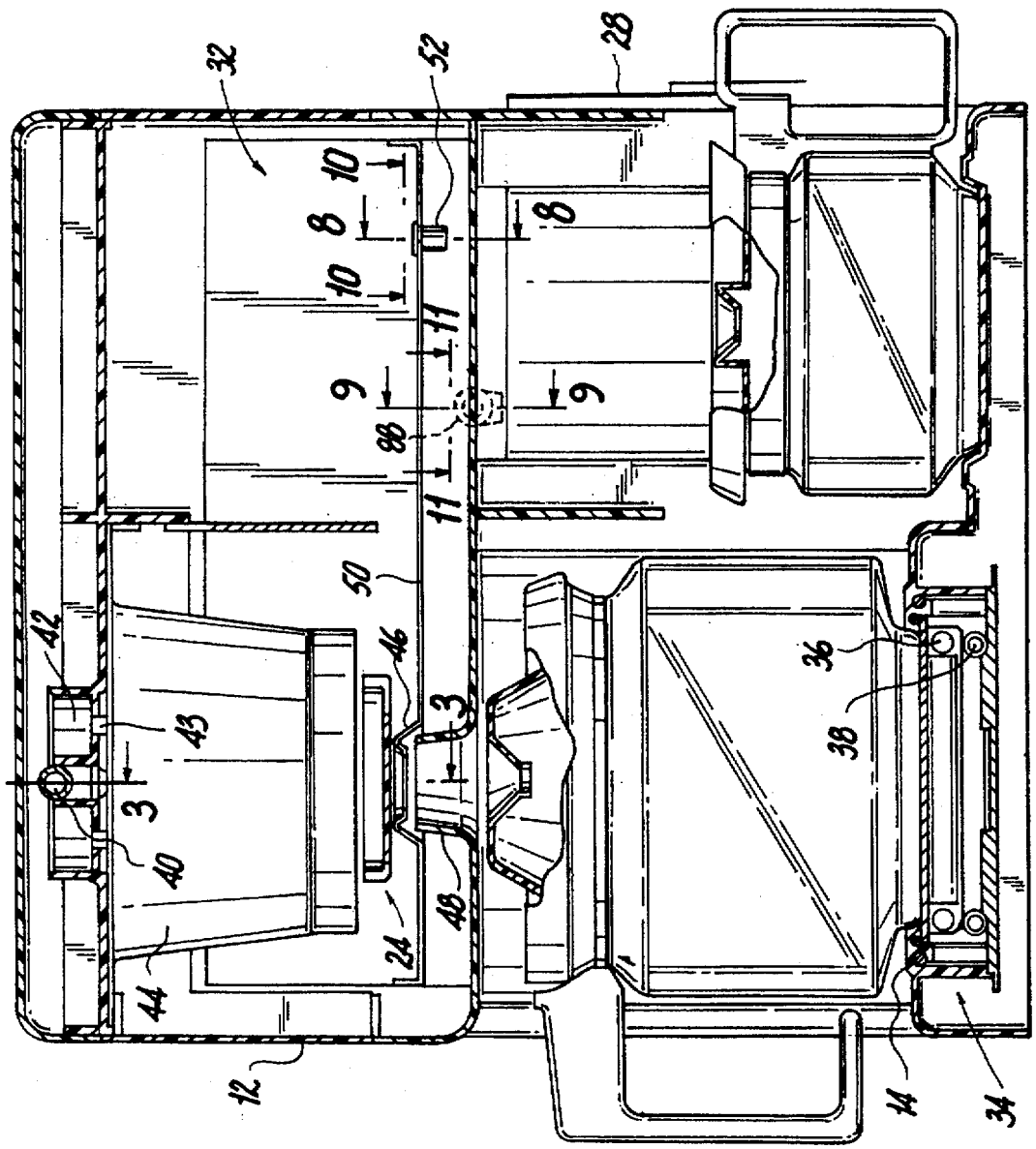
FIG. 2 is a cross-sectional view taken along lines 2—2 of FIG. 1 showing the internal components of the steeping system.
Figure 3:
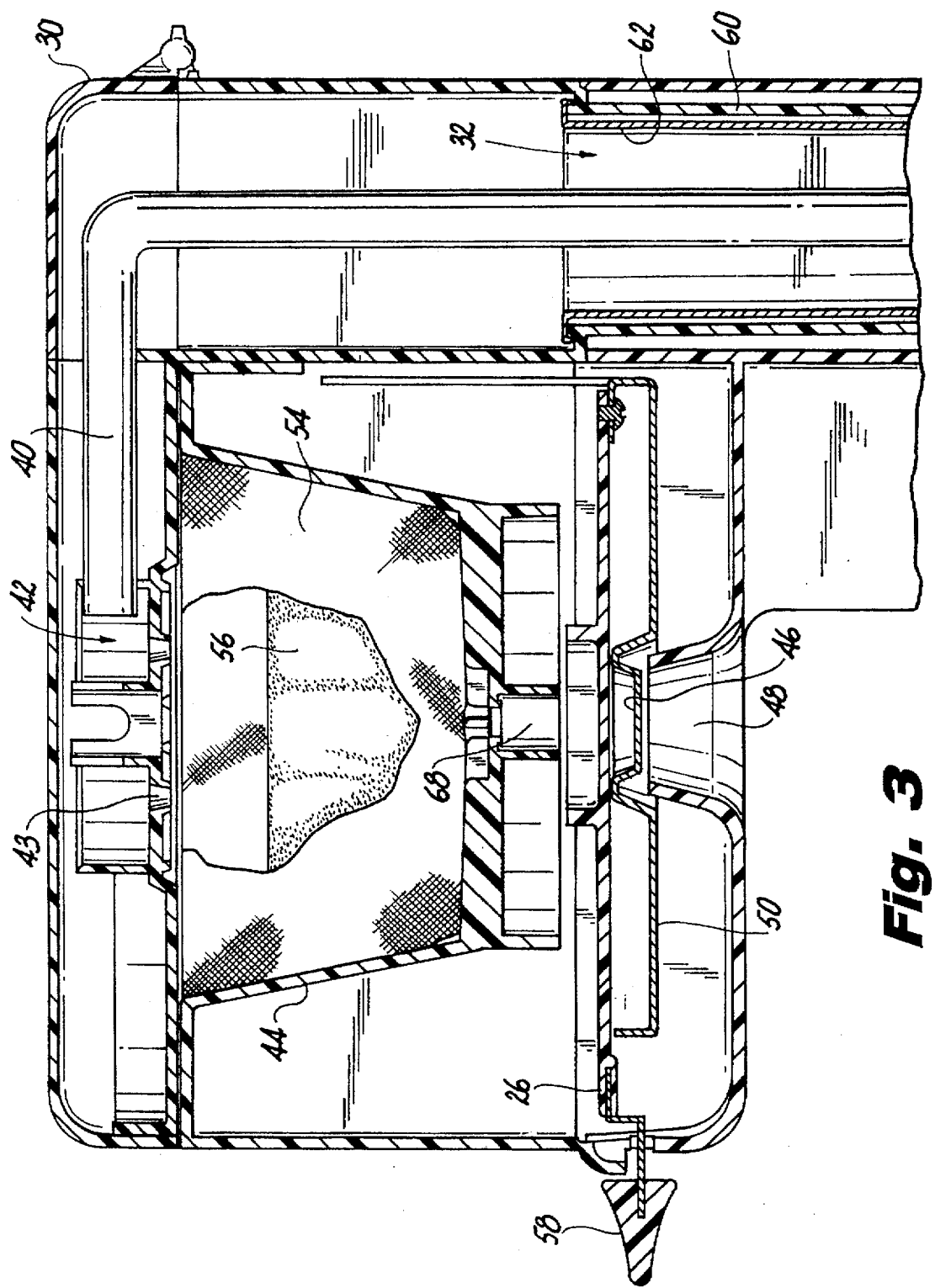
FIG. 3 is a cross-sectional view taken along lines 3—3 of FIG. 2 showing the components of the steeping system.
Figure 4:
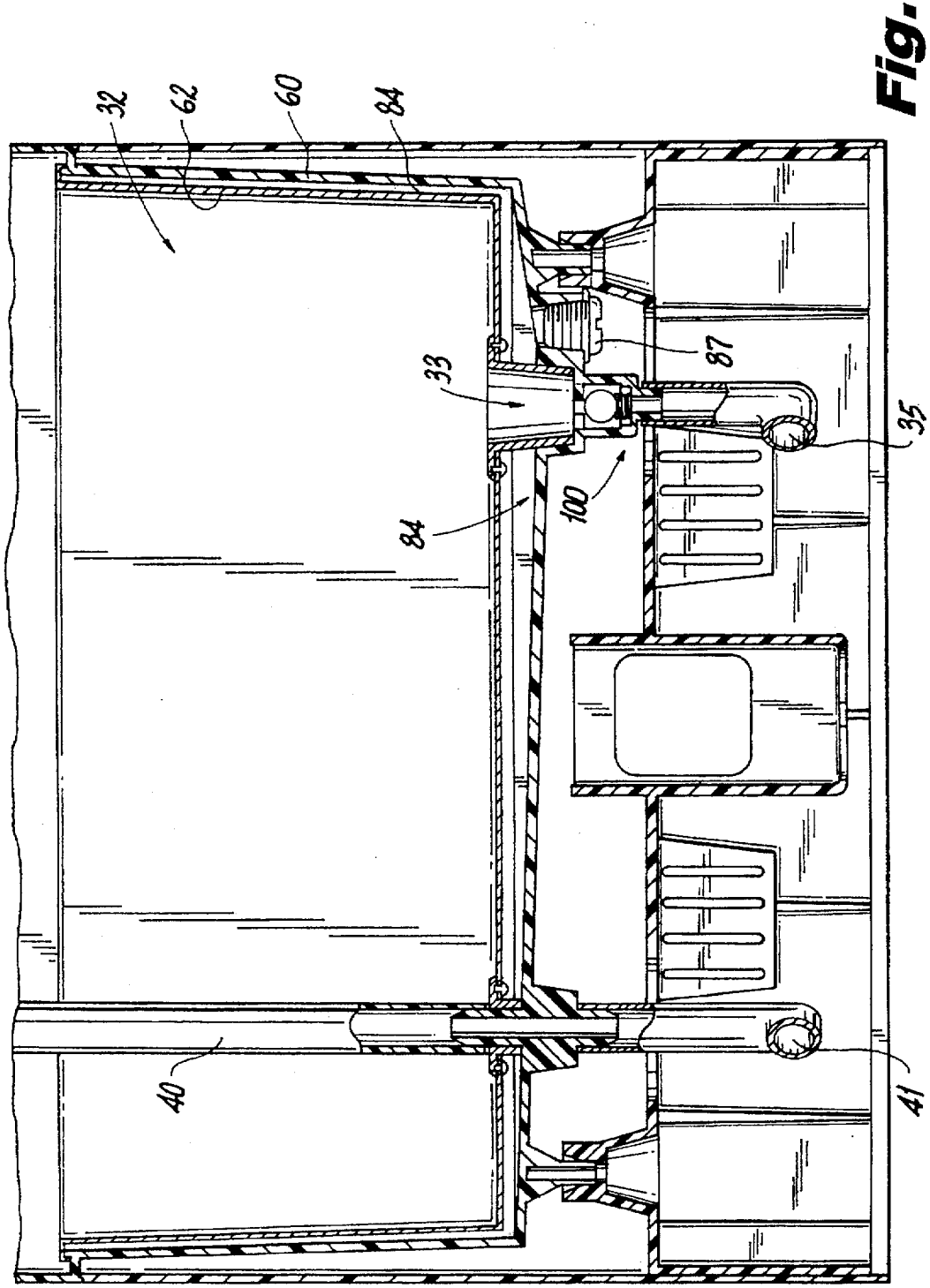
FIG. 4 is a cross-sectional view of the reservoir system taken along lines 4—4 of FIG. 1.
Figure 5:
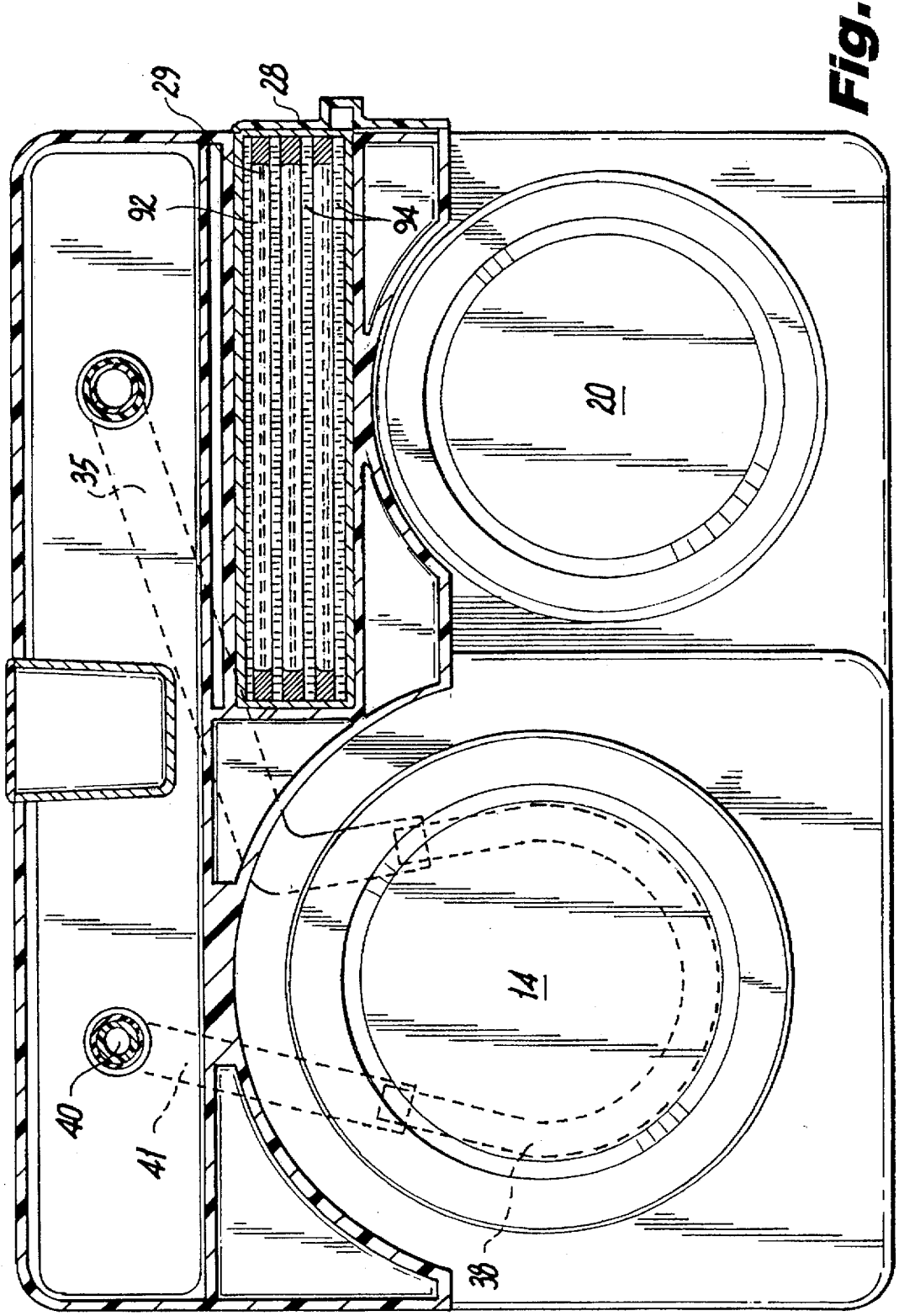
FIG. 5 is a cross-sectional view taken along lines 5—5 of FIG. 12 showing the fluid routing system from the reservoir to the heater.

FIG. 2 shows a cross-sectional view of the device 10 in partial cutaway, showing the brewing components from the front of the appliance. The brewing operation will now be described with reference to FIGS. 2–5. FIG. 3 shows a side cross-sectional view of the brew basket and lever assembly, while FIG. 4 shows a rear cross-sectional view showing the location of the tubing which carries the water from the reservoir to the heater and eventually to the brew basket. FIG. 5 shows a top cross-sectional view showing the routing of the tubing from the reservoir to the riser tube as the water travels from the reservoir through the heater and to the riser tube.

With reference to FIGS. 2 and 4, a reservoir bucket 32 is provided for holding a quantity of fresh water. The reservoir bucket is accessed from the reservoir cover 30, and preferably is constructed of a good heat conducting material such as aluminum or stainless, although plastic is also acceptable. The reservoir bucket 32 serves the dual purpose of holding fresh water for the brewing process, and for providing a heat exchange surface to cool the hot brewed beverage after it has been diverted to the cooling system.

The brewing process for the beverage brewing device 10 of the present invention is similar to that for a typical drip coffee maker. After fresh water is placed in the reservoir bucket 32, fresh water is fed, in metered amounts, through drain 33 and into inlet tubing 35. Drain 33 preferably includes a check valve or a ball valve device 100, which generally includes a ball and spring which permits water to pass through depending on the pressure on the heater side of the valve. When there is no water in the heater water tubing 38 of heater assembly 34, the valve opens due to the head pressure of the water which is greater than the spring force which holds the ball in sealing arrangement with the inlet to the valve. As the ball is forced downward in FIG. 4, water enters the drain 33 and into water inlet tubing 35 and the heater water tubing 38. When a sufficient amount of water enters the heater water tubing 38, the ball valve closes and water within the heater water tubing 38 is rapidly heated by the resistance heater 36. The water in tubing 38 is relatively instantaneously converted to steam and is expelled from tubing 38 through outlet tubing 41 and up through riser tube 40. This is shown in FIGS. 4 and 5.

With reference to FIG. 3, steam that is expelled upwardly through riser tuber 40 enters shower assembly 42 where the steam recondenses to water. The hot water drips through openings 43 in shower assembly 42, and falls onto the grounds 56 which are located within filter basket 44. Filter material 54 may be provided to hold the grounds, so that the brewed beverage may steep in the filter basket 44 to create the hot brewed beverage, or alternatively, the grounds may be contained in filter bags. As filter basket 44 fills with water, the brewed beverage exits the filter basket at filter basket outlet spout 68, where it passes through the switching assembly 24 and either through the hot brewed beverage outlet 46, 48 and into hot carafe 16, or the brewed beverage may be diverted by the switching assembly 24 to enter the cooling system as will be described below, depending on the position of the lever 26 of switching assembly 24.

Figure 6:
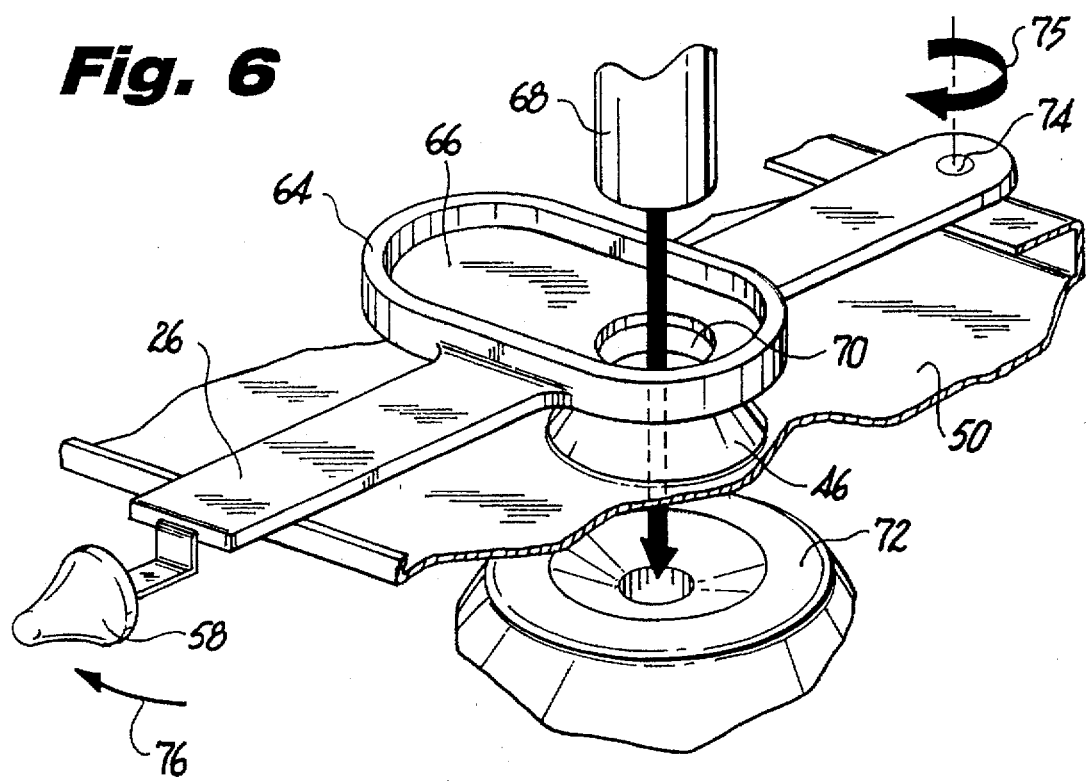
FIG. 6 shows a partial perspective view in partial cut-away of the lever assembly for diverting the flow of brewed beverage in which the lever is in a position for collecting hot brewed beverage.
Figure 7:
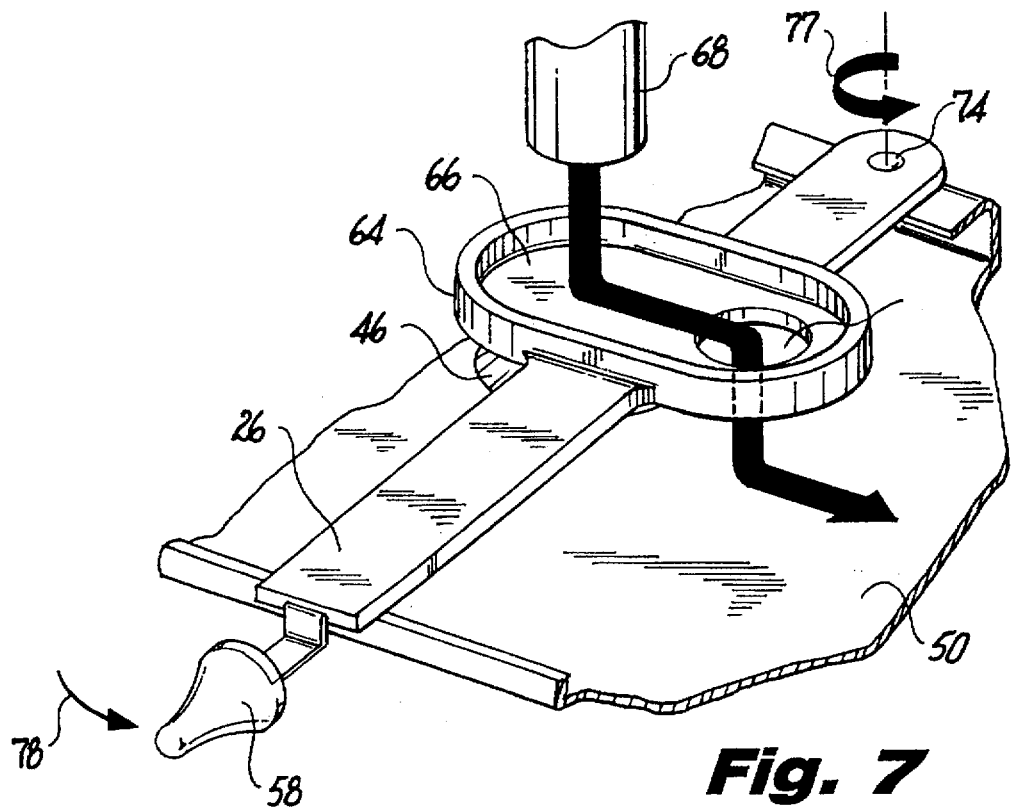
FIG. 7 is a partial perspective view in partial cut-away, similar to FIG. 6, in which the lever has been moved to a position to cool the brewed beverage.

FIGS. 6 and 7 illustrate the operation of the switching assembly 24 which includes lever 26 for diverting the brewed beverage. As seen in FIG. 6, a hot brewed beverage exits the filter basket outlet spout 68 and passes directly through the flow aperture 70 in the switching assembly, through the internal hot beverage outlet 46 and through the carafe cover 72 into the hot carafe 16. The internal outlet 46 is positioned in the air cooling pan 50, which represents the first cooling stage of the cooling system, as will be described below.

As seen in FIG. 6, the position of switching assembly 24 is similar to that shown in FIG. 1, where the lever knob 58 of lever 26 has been moved in the direction of arrow 76 so that the lever 26 rotates in the direction of arrow 75 about pivot point 74. When in this position, the flow aperture 70 in the diverter surface 66 is in alignment with the internal outlet 46, the external outlet 48 (as seen in FIGS. 2 and 3), and with the opening in the carafe cover 72 for the hot carafe 16. Hot brewed beverage flows directly from the filter basket and into the hot carafe.

When it is desired to produce a cold brewed beverage, the lever 26 of the switching assembly 24 is moved in the direction of arrow 78 so that the lever 26 rotates in the direction of arrow 77 about pivot point 74, as seen in FIG. 7. When the switching assembly is in this position, the hot brewed beverage which passes through filter basket outlet spout 68 impacts against the diverter surface 66 of the lever 26. The wall 64 of the diverter surface 66 contains the hot brewed beverage and directs it to the flow aperture 70, where is passes through the flow aperture onto the air cooling pan 50. Air cooling pan 50 represents the first cooling stage of the cooling system of the present invention. With reference to FIG. 2, air cooling pan 50 is tilted at a slight angle to permit the hot brewed beverage to flow along the cooling pan 50 to the first stage outlet 52 to exit the air cooling pan 50. The air cooling pan 50 spreads the hot brewed beverage out into a thin layer to permit dissipative air cooling by allowing the heat to rise and exit through the vents 31 in the top cover of the brewing device 10.

Figure 8:
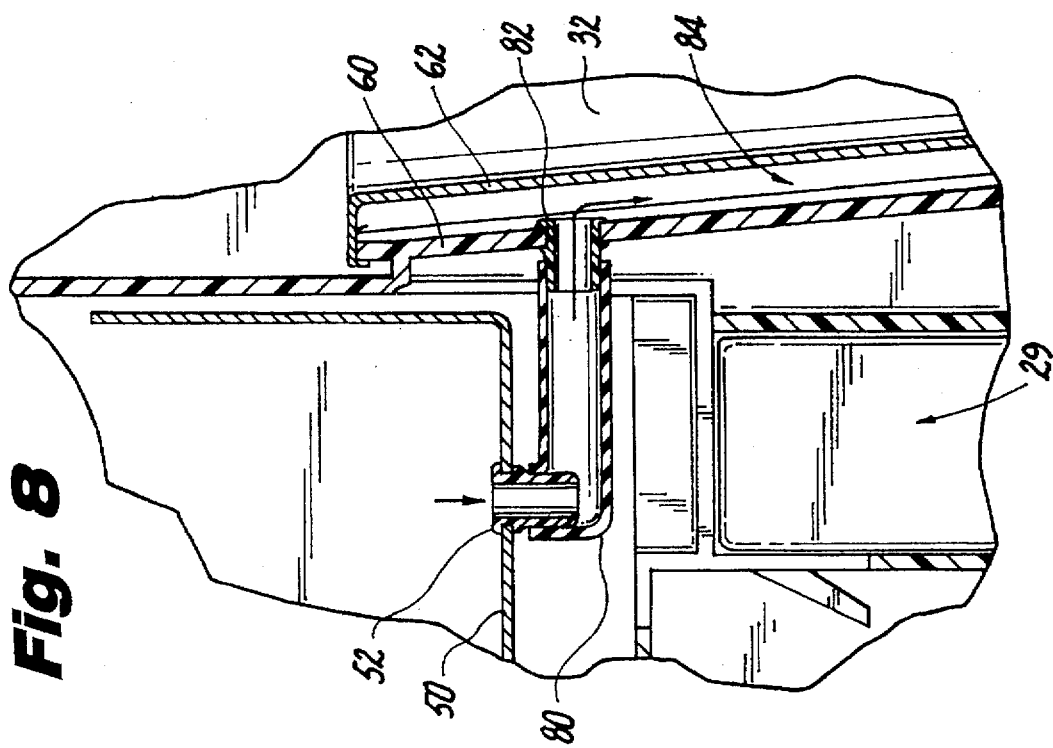
FIG. 8 is a partial cross-sectional view taken along lines 8—8 of FIG. 2 showing the flow path from the first cooling stage to the second cooling stage.
Figure 10:
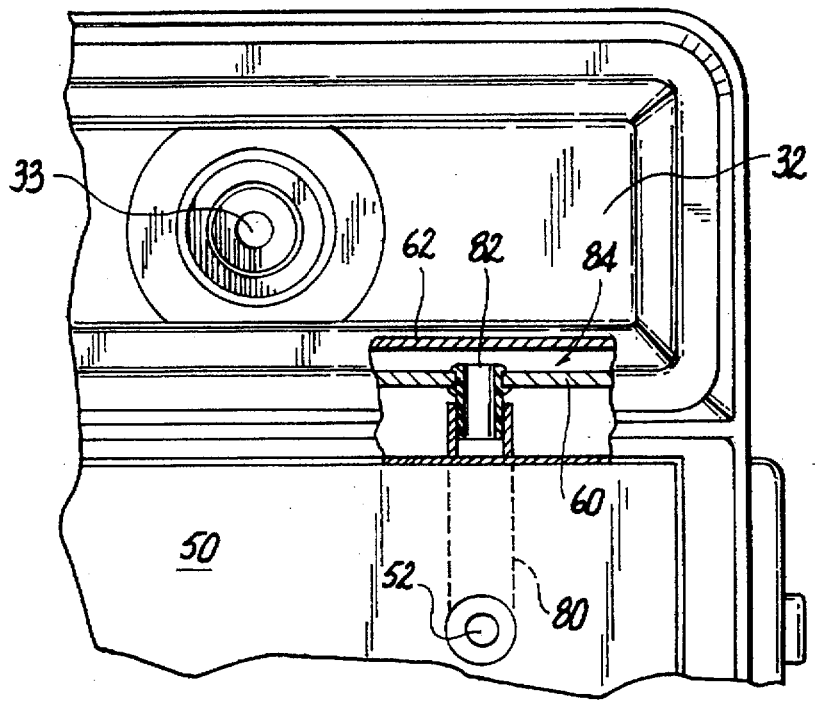
FIG. 10 is a partial perspective cut-away view taken along lines 10—10 of FIG. 2 showing the flow passageway from the first cooling stage to the second cooling stage.
Figure 12:
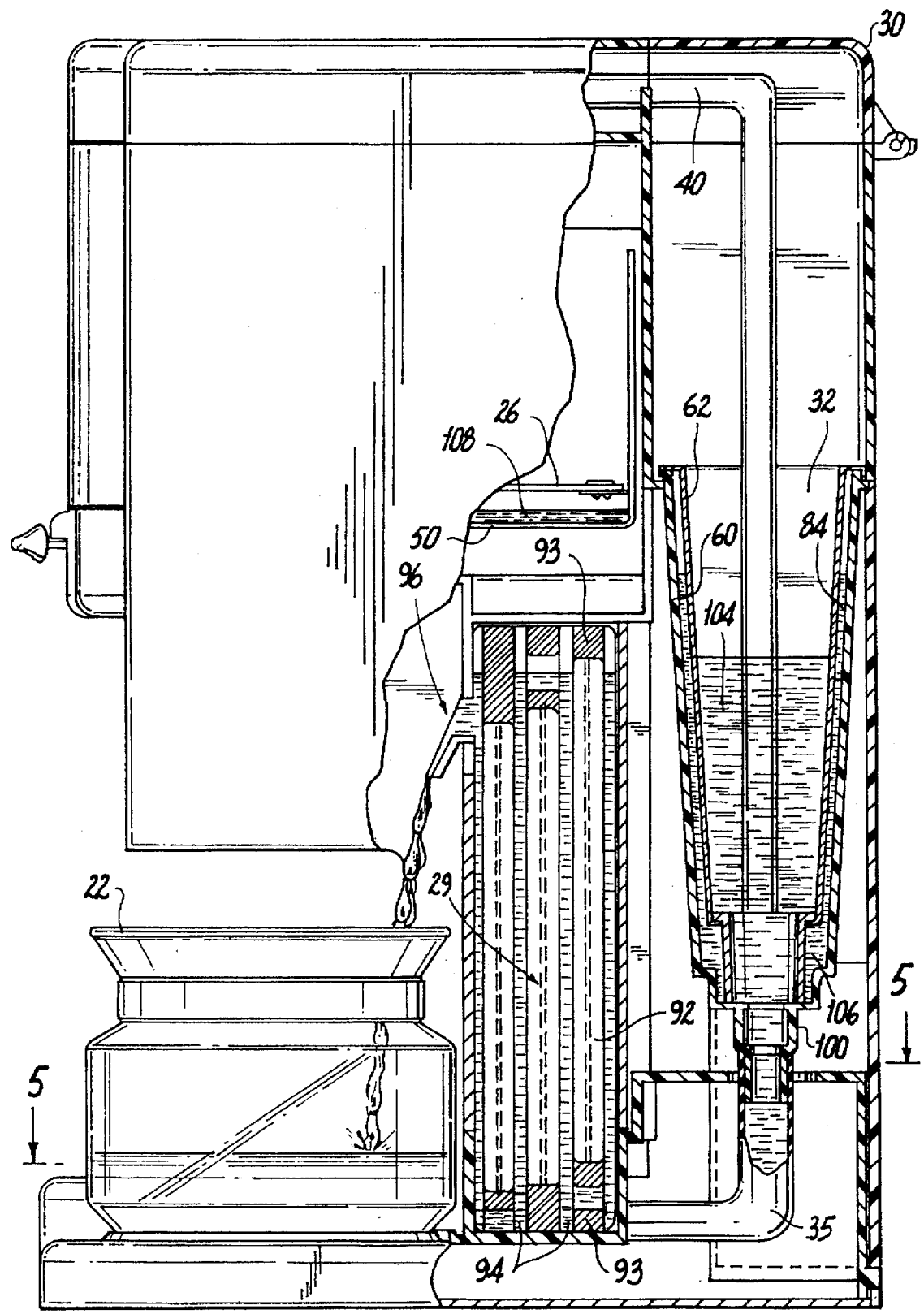
FIG. 12 is a right side elevational view in partial cut-away, taken along lines 12—12 of FIG. 1 showing the internal components of the beverage brewing apparatus and cooling system of the device.

As stated above, the brewing device 10 includes a three stage cooling system: an air cooling stage (as represented by air cooling pan 50), a water cooling heat exchange stage, and a cold cartridge cooling stage. As the brewed beverage travels along the air cooling pan 50 as shown in FIG. 2, the air cooled beverage leaves the first cooling stage via the first stage outlet 52 and enters the second cooling stage through the first stage conduit 80 and the second stage inlet, heat exchanger inlet 82. The second stage of the cooling system utilizes the heat exchange between the hot brewed beverage and the cold fresh water which is in the reservoir bucket 32. As seen in FIGS. 8 and 10, the hot beverage passes through the first stage outlet 52, travels along the first stage conduit 80 and through the heat exchanger inlet 82 into the space 84 provided between the wall 62 of the reservoir bucket 32, and the heat exchanger outer wall 60 as shown. Reference is also made to FIG. 12, which shows the cooling brewed beverage 106 between the walls 60 and 62, which utilizes heat exchange between the cold fresh water 104 and the cooling beverage 106 through the wall 62. As stated above, preferably, the wall 62 is made of a good heat conducting material, such as aluminum or stainless steel to permit the heat exchange between the water 104 in the reservoir bucket 32 and the brewed beverage 106 located in the space 84.

Figure 9:
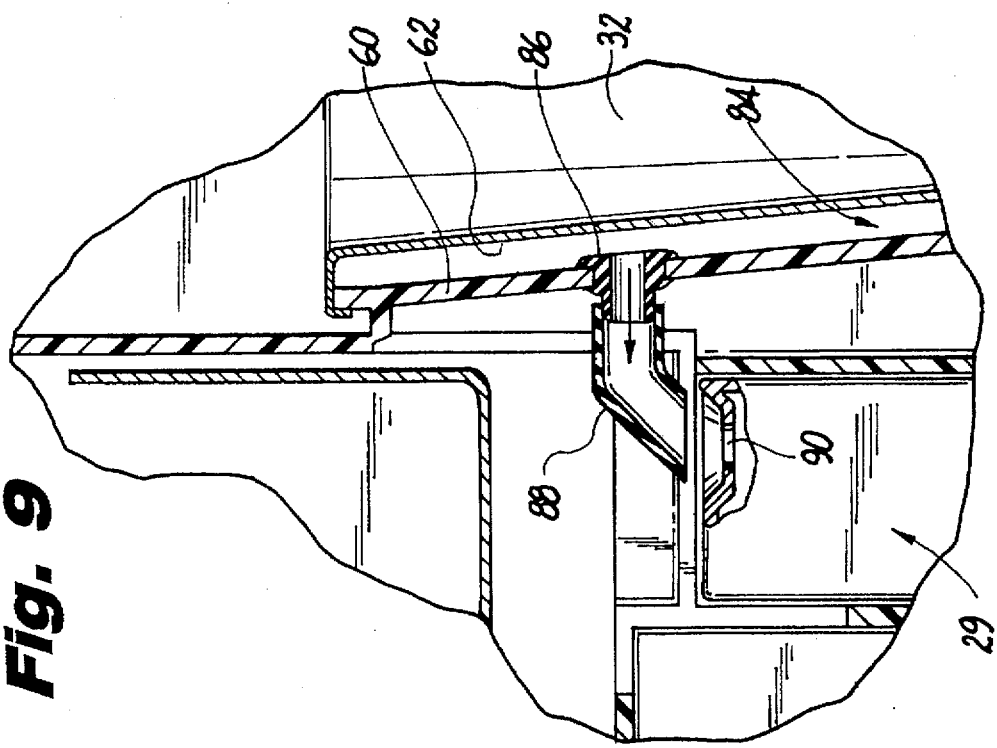
FIG. 9 is a partial cross-sectional view, similar to FIG. 8, taken along lines 9—9 of FIG. 2 showing the flow path from the second cooling stage to the third cooling stage.
Figure 11:
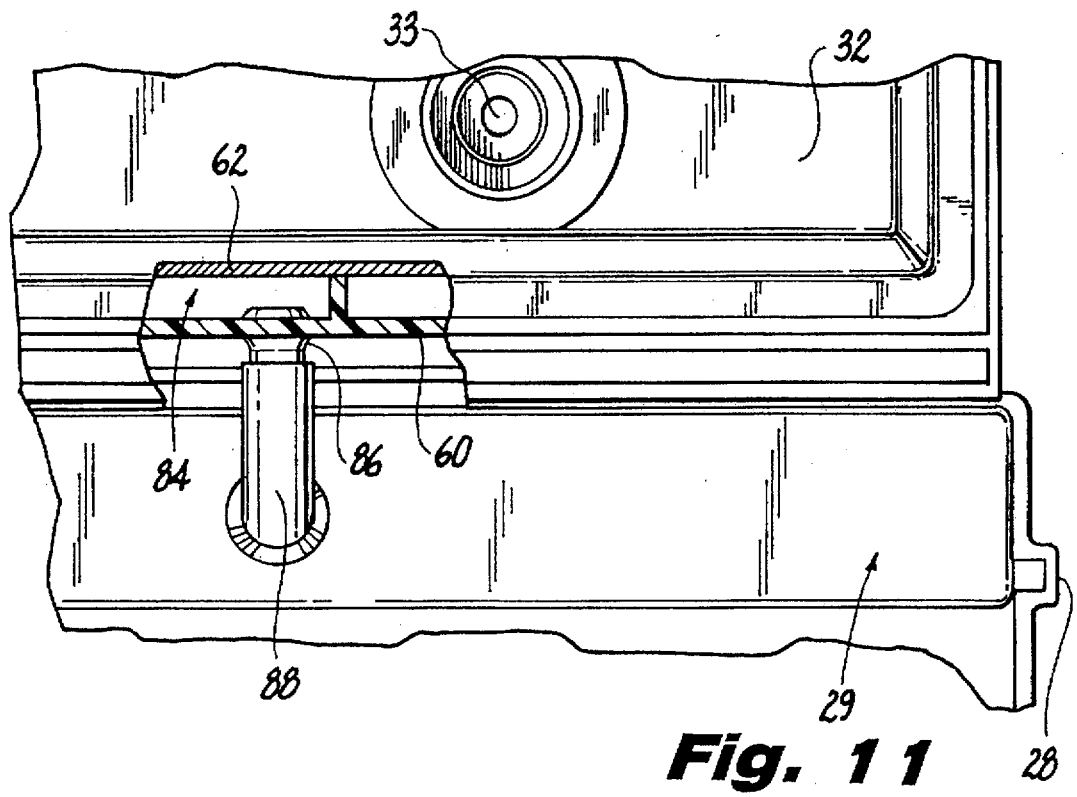
FIG. 11 is a partial perspective cut-away view, similar to FIG. 10, taken along lines 11—11 of FIG. 2 showing the flow passage from the second cooling stage to the third cooling stage.

Once the brewed beverage 108 (as seen in FIG. 12) has drained from the air cooling pan 50 and into the space 84 for the heat exchange stage, and the space 84 fills with the cooled brewed beverage, the beverage leaves the space 84 via the heat exchanger outlet 86 and the second stage conduit 88 for delivery to the third cooling stage. As seen in FIGS. 9 and 11, the heat exchanger outlet 86 communicates the space 84 with the second stage conduit 88 so that the cooled brewed beverage may be delivered to the cold retaining cartridge 29 through the third stage inlet 90. With reference to FIG. 12, as the liquid enters the third cooling stage through inlet 90, the cold elements 92 of the cartridge 29 further chill the brewed beverage as it passes through the series of passages 94 until it ultimately exits the cartridge 29 through the cold beverage outlet 96 and into the cold carafe 22 for collection and ultimate dispensing. It is also contemplated that the cold beverage may be delivered back to the "hot" carafe, so that only a single carafe need be provided, whereby the single carafe may collect hot or cold beverage, or a combination of both hot and cold beverage.

The cartridge 29 contains a plurality of cold elements 92 which are held in place by separators 93 and define a series of passageways 94 to permit the beverage to pass around the cold elements 92 until it reaches the outlet 96. The cold elements 92 and the cartridge 29 are described in greater detail below.

The brewing device 10 provides a three stage cooling system, utilizing an air cooling stage, a water cooling (heat exchanger) stage and a cold cartridge cooling stage. The embodiment shown in FIGS. 1–12 may result in some of the brewed beverage remaining in the cooling system after dispensing, and this remaining brewed beverage is removed from the system by removing the cold cartridge 29 for cleaning and draining, and by opening the drain 87 as shown in FIG. 4 to drain the liquid from the second stage of the cooling system.

Figure 13:
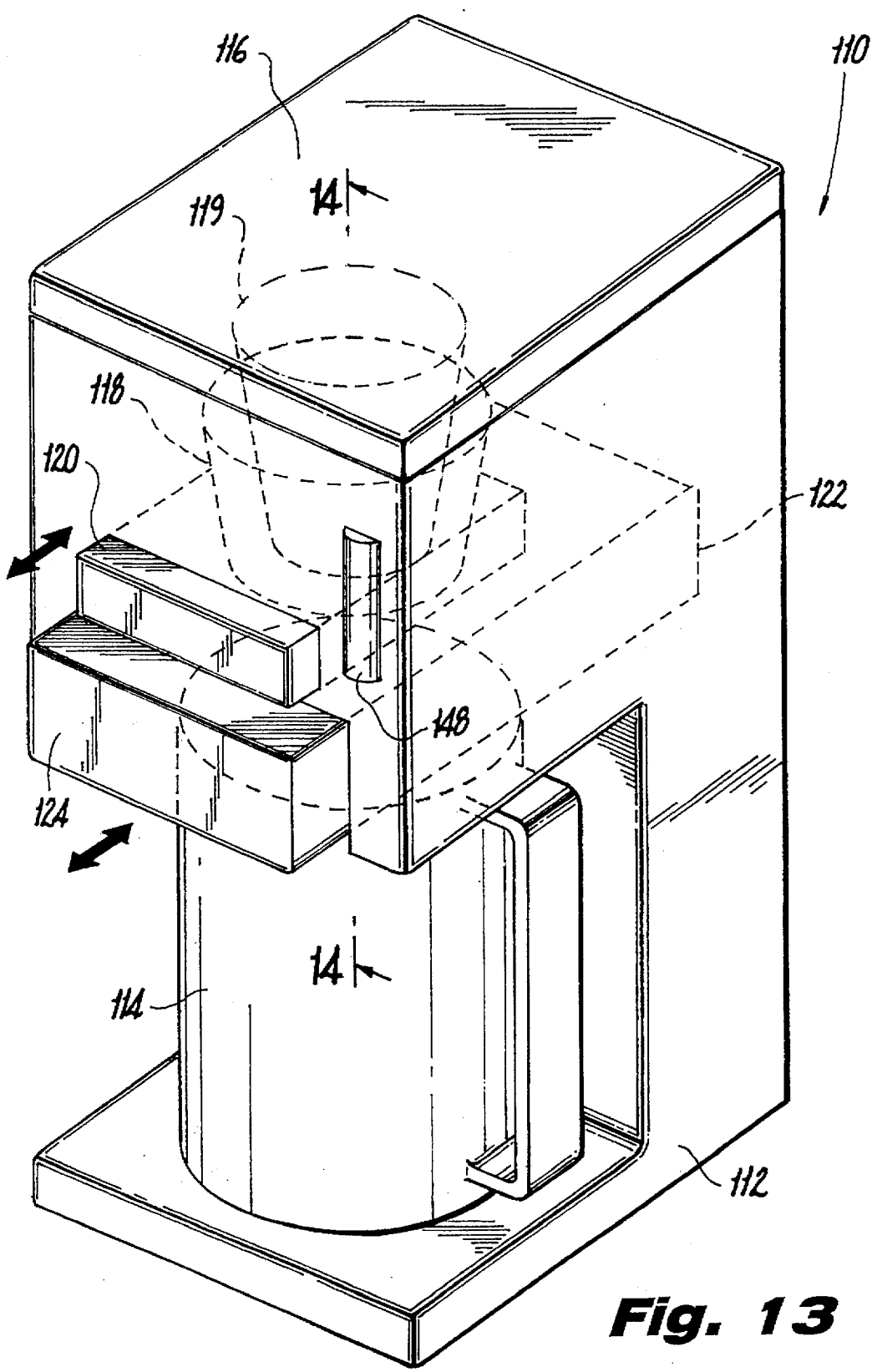
FIG. 13 illustrates a perspective view of an alternate embodiment of the beverage brewing device which is utilized for brewing a cold beverage.

FIG. 13 illustrates an alternate embodiment of the brewing device utilizing the cooling cartridge of the above cooling system. The brewing device 110 shown in FIG. 13 provides for brewing a hot beverage, and further provides for cooling that hot beverage if desired utilizing the cooling cartridge 122. As seen in FIG. 13, the brewing device 110 includes a base 112 for holding a carafe, cup or pitcher 114 for collecting the brewed beverage, whether it is hot or cold. A cover 116 is provided to permit access to the reservoir, the sugar holder 118 and the steeping basket 119, which are shown in phantom in FIG. 13. A basket holder/mixing tray 120 is provided, which holds the sugar holder 118 and the steeping container 119 as will be described below. The cold cartridge 122 may be slidably mounted on cartridge tray 124, which permits removal of the cartridge 122 from the brewing device 110, or it may be mounted vertically, similar to that shown in FIGS. 1–12.

Figure 14:
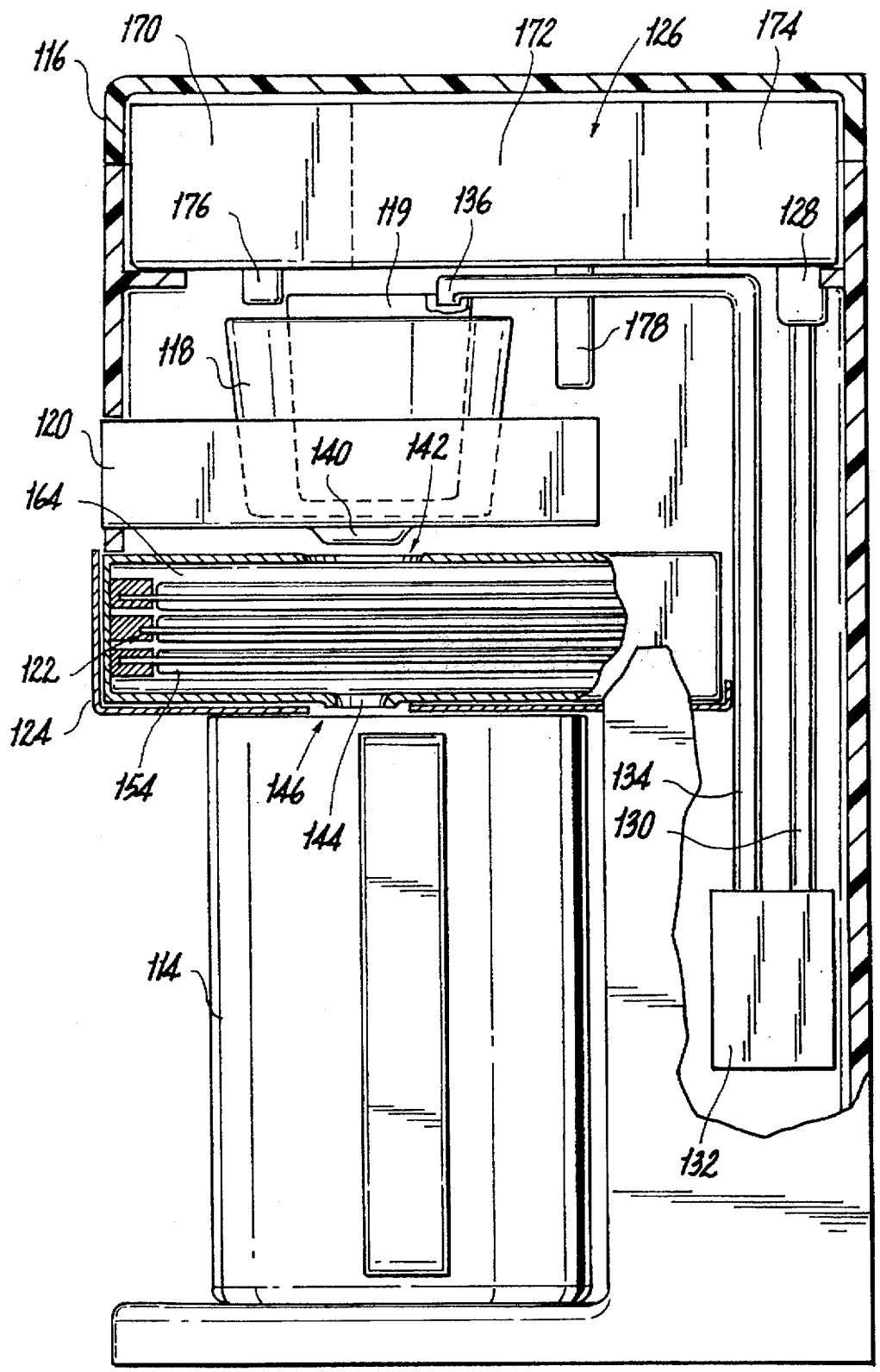
FIG. 14 is a side elevational view in partial cut-away, taken along lines 14—14 of FIG. 13, showing the internal components of the beverage brewing device of FIG. 13.

As seen in FIG. 14, a first embodiment of the brewing device 110 is shown. The reservoir 126 is separated into three compartments, whereby the first compartment 174 contains approximately 15% of the reservoir capacity for delivery, through check valve 128 and tubing 130, to the heater 132. Heater 132 rapidly heats the water to steam which rises through riser tube 134 and is delivered to the steeping chamber 119 via outlet 136. Steeping container 119 preferably holds grounds or leaf material such as tea leaves or coffee grounds, in either self-contained packages or in a typical filter material. As seen in FIG. 14, steeping container 119 is positioned in the optional sugar holder 118.

Figure 14A:
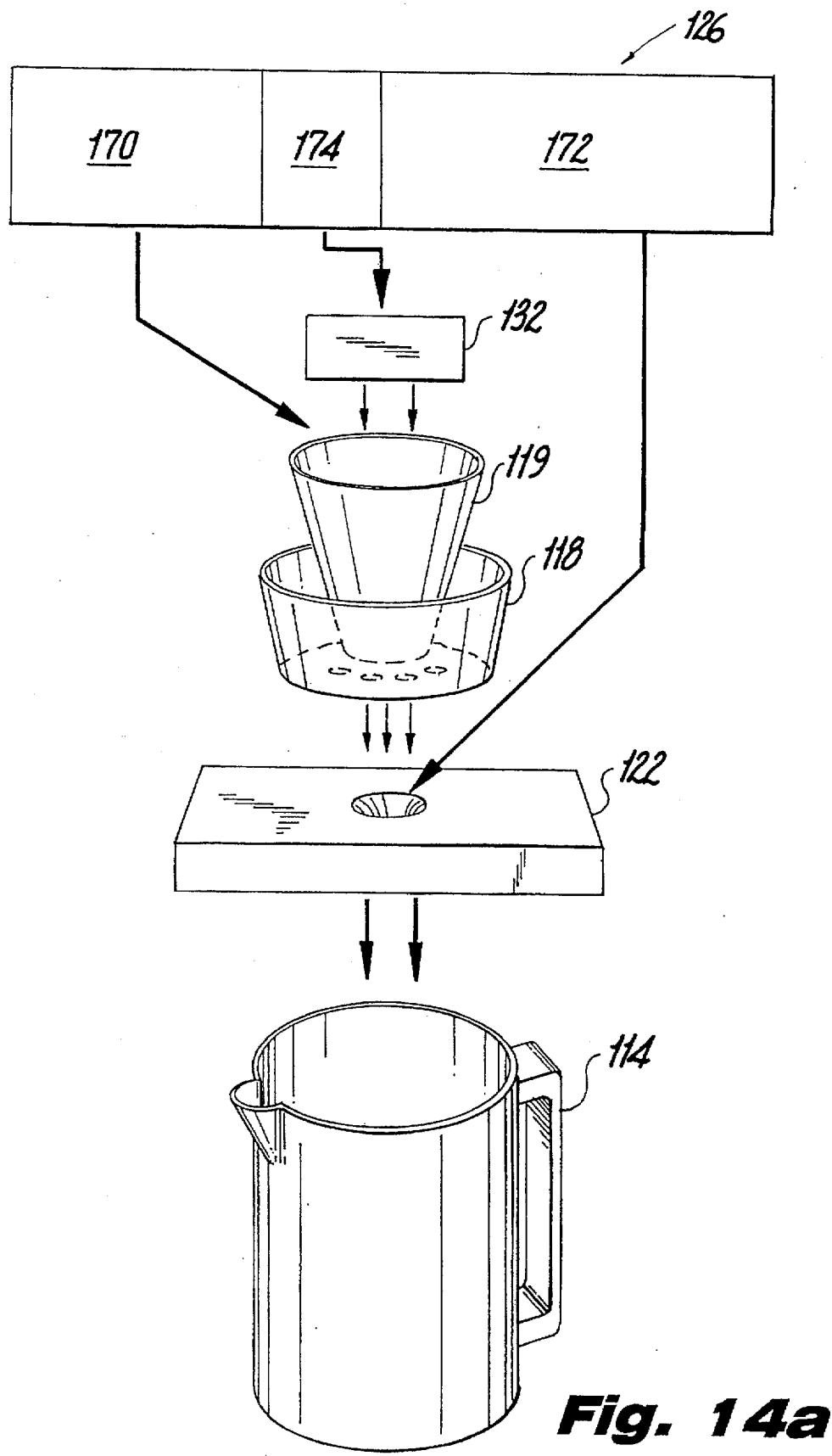
FIG. 14a is a representative schematic drawing in flow chart form showing the brewing process utilizing the device of FIG. 14.

During the brewing process that occurs in the steeping container 119, reservoir portion 172 delivers its 50% of the liquid capacity of reservoir 126 via cold water outlet 178 to the mixing tray 120 to mix with the steeped liquid and the sugar/water mixture for delivery to the cold cartridge via mixing tray outlet 140. Alternatively, as seen in FIG. 14a, the contents of portion 172 may be delivered directly to the cold cartridge 122. At this time, through the use of a float valve, timer, or other switch, reservoir portion 170, containing approximately 35% of the capacity of the liquid in the reservoir 126, feeds fresh water via outlet 176 to the sugar container 118 for mixing with the steeping beverage in the steeping container 119. Alternatively, as seen in FIG. 14a, the water from portion 170 may be fed directly to sleeping container 119. The hot/cold mixture passing through outlet 140 is cooled by the cold water from reservoir portion 172, and enters the cold cartridge at cold cartridge inlet 142. Cold cartridge 122 includes a plurality of cold elements 154 which chill the liquid as it passes through the series of passageways 164 in the manner described above. The cold cartridge 122 is positioned on the tray 124, which includes a tray outlet 146 in alignment with the cold cartridge outlet 144. After the brewed liquid passes through the plurality of passageways 164, it exits the cold cartridge 122 at outlet 144 and passes through the tray outlet 146 and into the pitcher 114 as a cold brewed beverage. Brewing device 110 is particularly suited for brewing iced tea or iced coffee without the use of ice cubes.

FIG. 14a illustrates a flow chart showing the operation of the brewing device 110 of FIG. 14. As seen in FIG. 14a, the reservoir 126 in a preferred embodiment holds two quarts of water, and approximately 15% of that water passes from reservoir portion 174 to the heater 132. The water is heated in heater 132 and delivered to steeping container 119 to steep the brewed beverage in container 119. As this occurs, 50% of the capacity of the water reservoir, contained in reservoir portion 172 may be delivered to the cooling cartridge 122 for cooling. As this occurs, the remaining 35% of the capacity of the liquid in the reservoir, contained in reservoir portion 170, is delivered for mixing with the steeped brewed liquid in the steeping container 119. The concentrated brewed beverage in container 119, the liquid from the reservoir portion 170, and the cold water from the reservoir portion 172 pass through the cooling cartridge 122 and into the pitcher 114 to result in two quarts of a cold brewed beverage such as iced tea or iced coffee. The system of brewing device 110 results in a substantially equal ratio of brewed beverage to fresh water.

Figure 15:
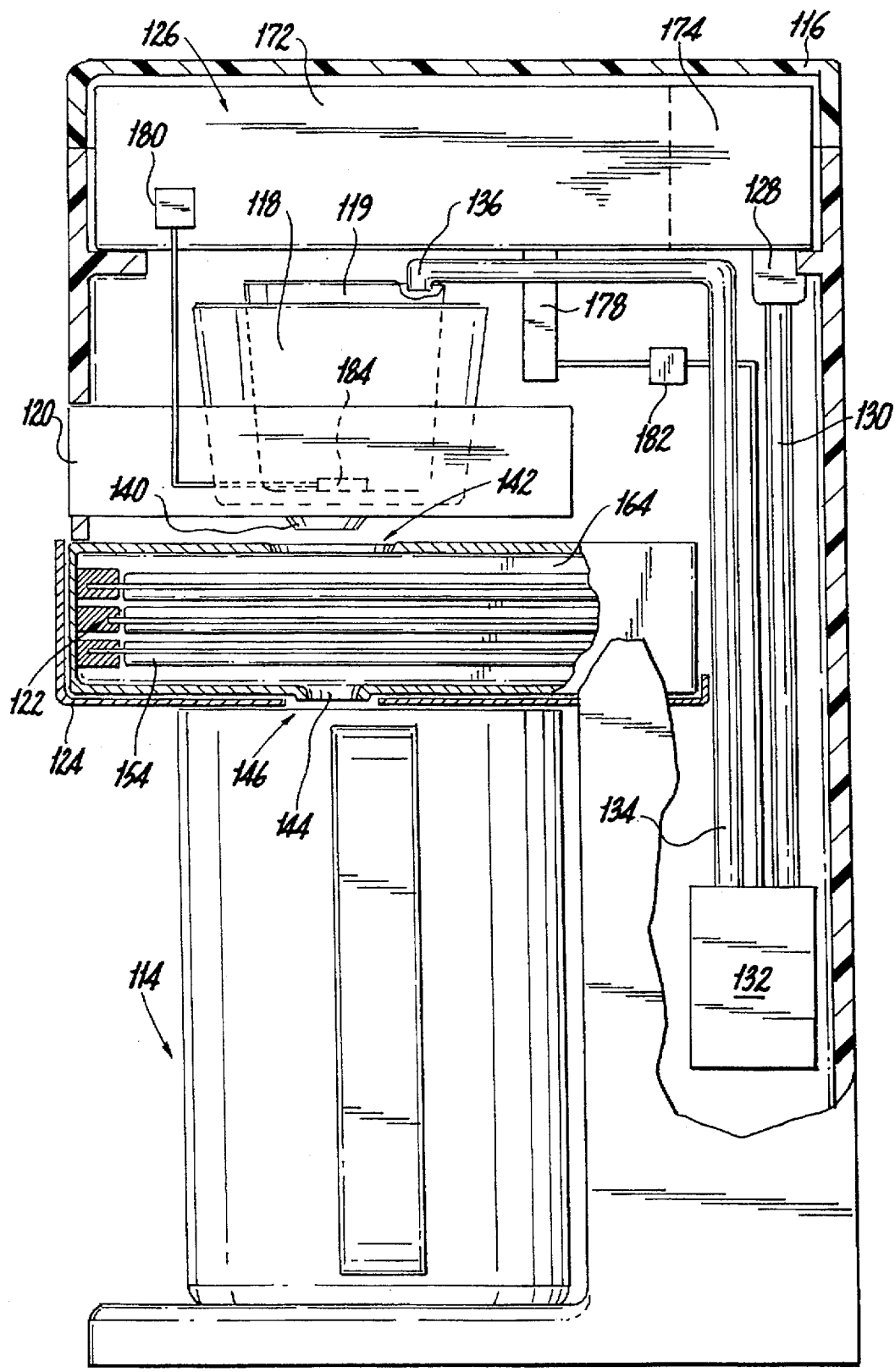
FIG. 15 is a side elevational view in partial cut-away, similar to FIG. 14, showing the internal components of an alternative embodiment of the device of FIG. 14.
Figure 15A:
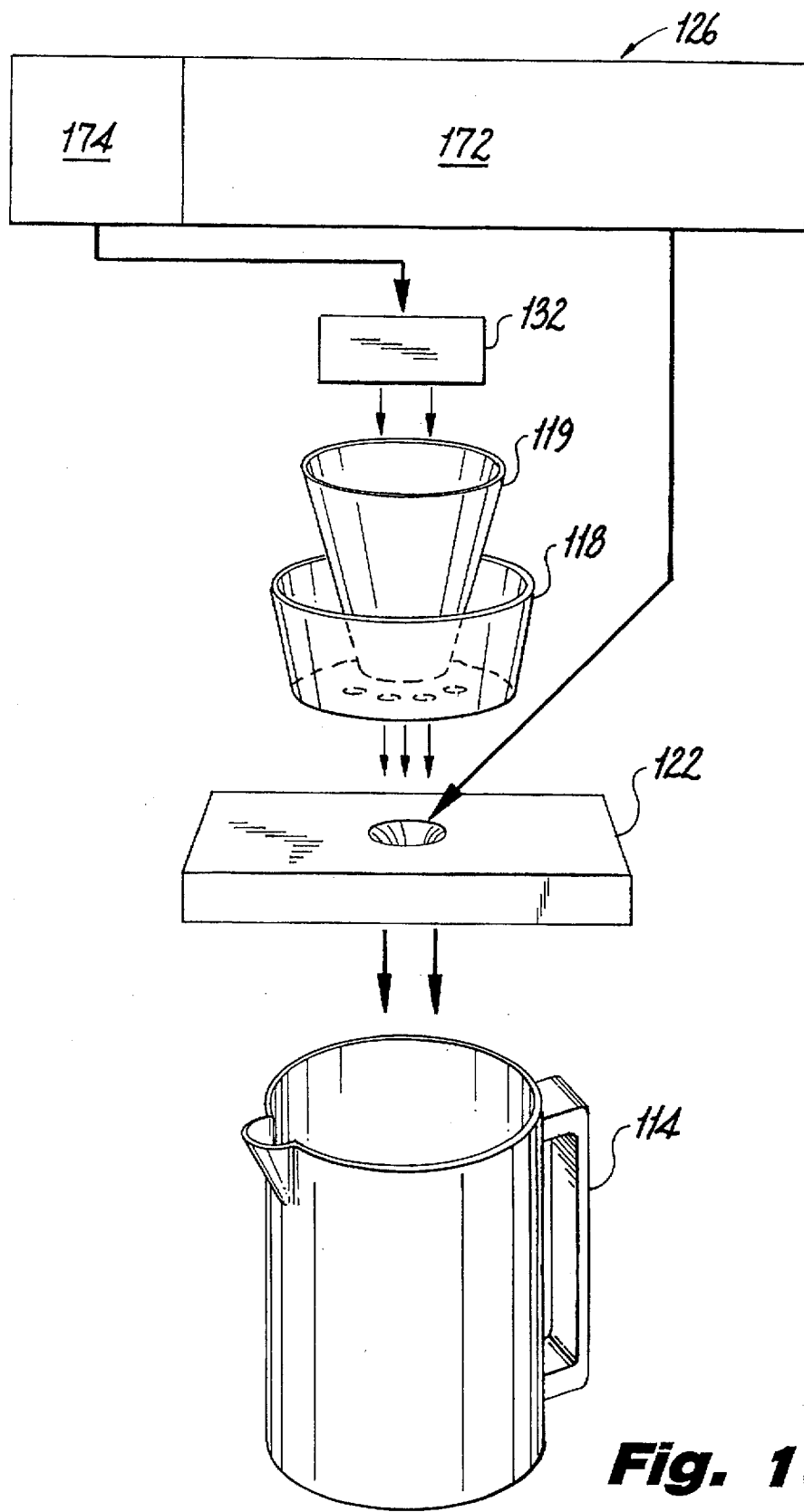
FIG. 15a is a representative schematic drawing in flow chart form showing the brewing process utilizing the device of FIG. 15.

FIG. 15 shows a second embodiment of brewing device 110. In this embodiment, reservoir 126 is separated into two compartments, whereby compartment 174 contains 15% of the reservoir capacity and compartment 172 contains the remaining 85%. Float valves or level indicators 180 and 182 are provided for controlling valve 184 and the heater 132 respectively. After reservoir 126 is filled with water, and cartridge 122 is inserted into the device, the appliance is energized and the heater turns on. Water enters the heater 132 via check valve 128 and hot steam is delivered to the steeping container 119 in the manner described above. Cold water outlet 178 simultaneously drains cold, fresh water to mixing tray 120 for delivery to the cartridge 122 (or outlet 178 may deliver the cold fresh water directly to the cartridge 122, as seen in FIG. 15a). Steeping occurs in steeping container 119 until float valve 180 indicates a predetermined water level in the reservoir 126, causing valve 184 to open, releasing the brewed beverage from steeping container 119 through outlet 140 to cartridge 122. When float valve 182 indicates a second predetermined water level in reservoir 126, the heater 132 is shut off. The brewed beverage then mixes with the cold water in pitcher 114 in a predetermined, and controlled, ratio to ensure consistent strength and flavor of the brewed beverage from cycle to cycle.

Figure 16:
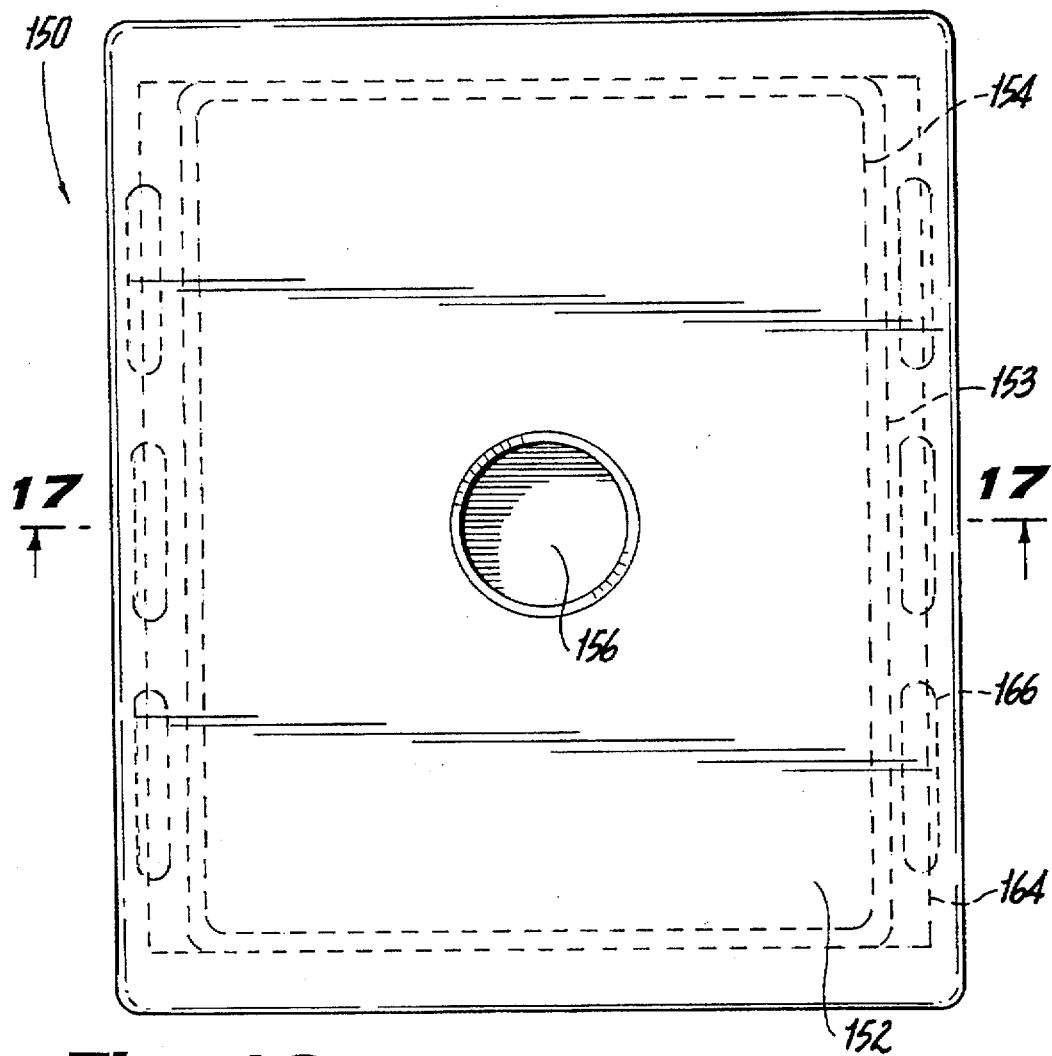
FIG. 16 illustrates a top plan view of the cold retaining cartridge utilized for cooling liquid in the beverage brewing device according to a first embodiment.
Figure 17:
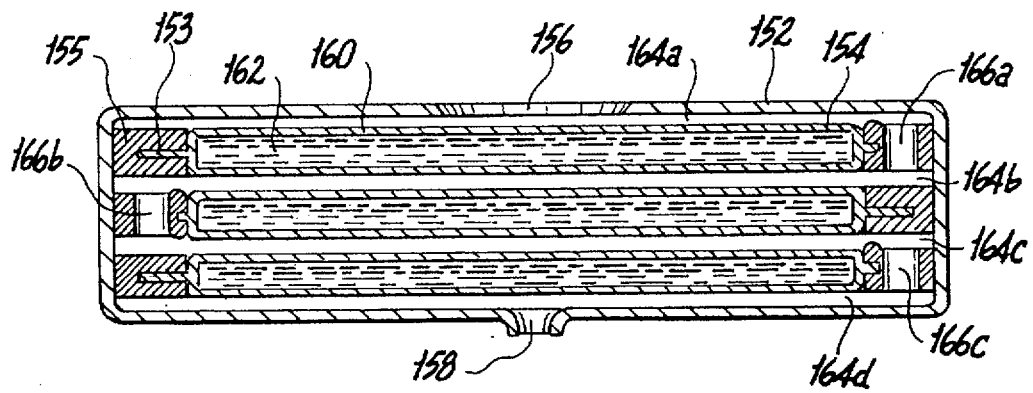
FIG. 17 shows a cross-sectional view taken along lines 17—17 of FIG. 16 of the cold retaining cartridge.

Turning now to FIGS. 16 and 17, there is illustrated an embodiment of the cold cartridge 150, which is similar to the construction of the cold cartridge 29 of FIGS. 1–12 and cold cartridge 122 of FIGS. 13–15. The cold cartridge 150 consists of a plastic enclosure or outer casing 152 which houses a plurality of cold elements 154. The cold elements 154 each contain a cold retaining liquid or gel 162 and have a cooling element 153 passing through the casing 160 and the cold retaining liquid or gel 162. The cooling elements 153 are preferably constructed of aluminum or copper which retains the cold along with the cold retaining liquid 162. The cold retaining liquid 162 preferably is a mixture of water and alcohol or other cold retaining fluids, having a freezing point of around −10° C. The cold elements 154 are mounted and secured to a flexible frame member 155 located at either side of the cold cartridge. The frame members 155 include a plurality of openings 166 located on opposite sides of the cold cartridge to permit the flow of the brewed beverage in the passageways 164 as will be described below.

Since there is a change of volume during the thermal expansion and contraction of the liquid or gel 162, the cold elements 154 are designed to include a volume change compensation component, such as air pockets, sponge-like cushioning members or membrane-like ribs. This can also be accomplished using the flexible frame elements 155.

The outer enclosure 152 includes an inlet 156 and an outlet 158, which are positioned on opposite sides of the cooling cartridge, and in accordance with the end use of the cooling cartridge. As shown, the cooling cartridge 150 provides an inlet 156 and an outlet 158 located centrally on the top and bottom, respectively, of the cooling cartridge 150. Referring to FIGS. 1–12, the openings preferably are provided on one end wall and one side wall as shown due to the end use of the cooling cartridge 29. However, in operation, the cooling cartridges 29, 122 and 150 are similar.

The cooling cartridge 150 is placed in a conventional refrigerator or freezer prior to use so that the liquid or gel 162 is chilled to approximately −10° C. and becomes frozen. The cooling cartridge is then placed in the appliance so that the brewed beverage may be run through the cooling cartridge, by entering inlet 156 and the first passageway 164a. The liquid travels by gravity to the passageway connector 166a and into the second passageway 164b. As the liquid travels through the passageways, the heat is absorbed by the liquid or gel 162 in cooling elements 154, to cool the liquid. The liquid in the second passageway 164b travels to the passageway connector 166b and into passageway 164c. This continues through passageway connector 166c and into passageway 164d and the liquid, which is now completely cooled, exits the cooling cartridge 150 through the outlet 158 and into the pitcher.

While the cooling cartridge 122 and 150, and the cooling cartridge 29, are shown for use with the brewing device of the present invention, it is clear that the cooling cartridge may be utilized to cool any beverage, simply by passing the beverage through the inlet so that it drains at the outlet and into a receptacle. While the invention has been shown and described with respect to preferred embodiments, it will be understood by those skilled in the art that various modifications and changes may be made therein without departing from the spirit and scope of the invention.

What is claimed is:

1. A beverage brewing device for dispensing a brewed beverage comprising:

a housing;

a water reservoir located within the housing;

a heater for heating water placed in the reservoir;

a filter basket for containing beverage media, said filter basket having an outlet;

means for delivering water from the heater to a location above the filter basket to permit hot water to contact beverage media in the filter basket to brew a beverage;

a first container for collecting the hot brewed beverage;

a cooling system located within the housing for cooling the hot brewed beverage, said cooling system including a removable cold retaining element which contacts the brewed beverage to cool said beverage; and a deflector member movable from a first position which permits the hot brewed beverage to flow from the outlet of the filter basket to the first container, to a second position which directs the hot brewed beverage to the cooling system to reduce the temperature of the brewed beverage.

2. A beverage brewing device according to claim 1, further comprising a second container for collecting the cooled brewed beverage.

3. A beverage brewing device according to claim 1, wherein said cooling system includes an outlet for delivering the cooled brewed beverage to said first container.

4. A beverage brewing device according to claim 1, wherein said cooling system includes at least one heat sink for dissipating heat from said hot brewed beverage to cool said beverage.

5. A beverage brewing device according to claim 1, wherein said cooling system includes a first stage having a heat sink for air cooling said hot brewed beverage, a second stage having a heat exchanger downstream from said heat sink for further cooling said beverage, and a third stage having said cold retaining element downstream from said heat exchanger to further cool said beverage.

6. A beverage brewing device according to claim 5, wherein said third stage includes an outlet to deliver said cooled beverage to a container.

7. A beverage brewing device according to claim 5, wherein said heat exchanger includes a wall member in contact with said water reservoir, said wall member serving as a heat exchange surface between water in said reservoir and said brewed beverage.

8. A beverage brewing device according to claim 1, wherein said deflector member includes a deflector surface and a drain opening, said drain opening being in alignment with the outlet of the filter basket when in the first position, and being in alignment with at least a portion of the cooling system when in the second position.

9. A beverage brewing device for dispensing a brewed beverage comprising:

a housing;

a water reservoir located within the housing;

a heater for heating water placed in the reservoir;

a filter basket for containing beverage media, said filter basket having an outlet;

means for delivering water from the heater to a location above the filter basket to permit hot water to contact beverage media in the filter basket to brew a beverage;

a first container for collecting the hot brewed beverage;

a cooling system located within the housing for cooling the hot brewed beverage, said cooling system including a heat exchanger; and a deflector member movable from a first position which permits the hot brewed beverage to flow from the outlet of the filter basket to the first container, to a second position which directs the hot brewed beverage to the cooling system to reduce the temperature of the brewed beverage; wherein said heat exchanger includes a wall member in contact with said water reservoir, said wall member serving as a heat exchange surface between said water in said reservoir and said hot brewed beverage.

10. A device for preparing a cooled beverage comprising:

a housing;

a water reservoir located within the housing;

a brewing mechanism including a heater, a filter basket for holding media for brewing a beverage, a conduit for delivering water from the heater to the filter basket;

a cooling system located within the housing for cooling the hot brewed beverage, said cooling system including an outlet; and a container located adjacent the outlet of the cooling system for collecting the cooled brewed beverage; wherein the cooling system includes a first stage having a heat sink for air cooling the hot beverage, a second stage including a heat exchange surface downstream from said heat sink, and a third stage having a cold retaining element downstream from the heat exchange surface, said third stage including said outlet to the container for collecting the cooled beverage.

11. A device according to claim 10, wherein the cooled beverage is of the same concentration as the hot beverage.

12. A device according to claim 10, wherein said cooling system cools said hot beverage through surface contact with said hot beverage.

13. A device according to claim 10, wherein said cooling system includes at least one heat exchange surface in contact with said hot beverage.

14. A device according to claim 13, wherein said at least one heat exchange surface includes a wall of said housing defining said reservoir, such that heat exchange occurs through said wall between cold water in the reservoir and the hot brewed beverage.

15. A device according to claim 13, wherein said at least one heat exchange surface includes a heat sink for air cooling said hot beverage by heat dissipation.

16. A device according to claim 13, wherein said at least one heat exchange surface includes a cold retaining element being removable for chilling and having at least one passageway to permit said hot beverage to contact the element for cooling.

17. A device according to claim 10, wherein an inlet to said cooling system is in alignment with an outlet of the brewing mechanism.

18. A method of preparing a brewed beverage in an appliance, the method comprising the steps of:

providing water in a cold water reservoir in the appliance;

providing beverage media in a filter basket of the appliance;

heating the water in the appliance and delivering the hot water to the filter basket to brew a hot beverage;

delivering the hot brewed beverage to a cooling system in the appliance;

cooling the beverage without refrigeration, said cooling step utilizing a removable cold retaining element; and delivering the cooled beverage to a container for dispensing.

19. The method of claim 18, further comprising the step of air cooling the hot brewed beverage delivered to the cooling system utilizing a heat sink.

20. The method of claim 18, further comprising the steps of:

providing a deflector mechanism to divert flow of brewed beverage leaving the filter basket; and moving the deflector mechanism between a first position in which the brewed beverage is permitted to flow to the cooling system, and a second position in which the brewed beverage bypasses the deflector mechanism to flow directly to a container for dispensing.

21. A beverage brewing device for dispensing a brewed, undiluted beverage comprising:

a housing including a water reservoir; a brewing mechanism; means for delivering and dispensing brewed beverage to a container; and a three-stage passive cooling system intermediate said brewing mechanism and said container, said cooling system including a replaceable cold retaining element at one of said stages.

22. A beverage brewing device according to claim 21, wherein said cooing system includes a first stage having a heat sink for air cooling said hot brewed beverage, a second stage having a heat exchanger downstream from said heat sink for further cooing said beverage, and a third stage having a cold retaining element downstream from said heat exchanger to further cool said beverage.

23. A beverage brewing device according to claim 22 wherein said heat exchanger includes a wall member in contact with said water reservoir, said wall member serving as a heat exchange surface between said water in said reservoir and said hot brewed beverage.

24. A beverage brewing device according to claim 21, wherein said third stage includes an outlet to deliver said cooled beverage to said container.

* * * * *